United States Patent [19]

Fischer et al.

[11] 3,771,931

[45] Nov. 13, 1973

[54] APPARATUS FOR MOLDING PLASTIC ARTICLES

[75] Inventors: Robert P. Fischer, Lancaster; Donald H. Straub, Mt. Joy, both of Pa.

[73] Assignee: Keer Glass Manufacturing Corporation, Los Angeles, Calif.

[22] Filed: Aug. 13, 1970

[21] Appl. No.: 63,550

[52] U.S. Cl. .............................. 425/72, 425/326 B
[51] Int. Cl. ........................... B29d 23/04, B29f 3/08
[58] Field of Search .......................... 18/14 A, 5 BE; 425/326, 72, 243, 387, 324 B

[56] References Cited
UNITED STATES PATENTS

| | | | |
|---|---|---|---|
| 2,433,937 | 1/1948 | Tornberg | 18/14 A |
| 2,462,808 | 2/1949 | Danner | 18/14 A X |
| 2,612,656 | 10/1952 | Lyon | 18/14 A UX |
| 2,708,772 | 5/1955 | Moncrieff | 18/14 A X |
| 3,170,011 | 2/1965 | Cheney et al. | 18/14 A X |
| 3,337,911 | 8/1967 | Settembrini | 425/326 |
| 3,344,471 | 10/1967 | Martelli | 425/326 X |
| 3,427,375 | 2/1969 | Turner | 425/326 X |
| 2,861,295 | 11/1958 | Hagen et al. | 425/326 |
| 3,127,458 | 3/1964 | Scott, Jr. et al. | 425/326 X |
| 3,168,207 | 2/1965 | Noland et al. | 264/98 X |
| 3,188,983 | 6/1965 | Tomberg | 425/143 |
| 3,438,088 | 4/1969 | Westbrook | 425/143 X |

Primary Examiner—Robert L. Spicer, Jr.
Attorney—Anderson, Luedeka, Fitch, Even and Tabin

[57] ABSTRACT

A method and apparatus for blow molding of hollow plastic articles such as bottles and containers from continuously extruded tubular parison by employing a cooling system acting upon the parison between the extruder and the molds to control the temperature of the parison as it enters the mold to provide an improved product having walls of relatively uniform thickness.

4 Claims, 3 Drawing Figures

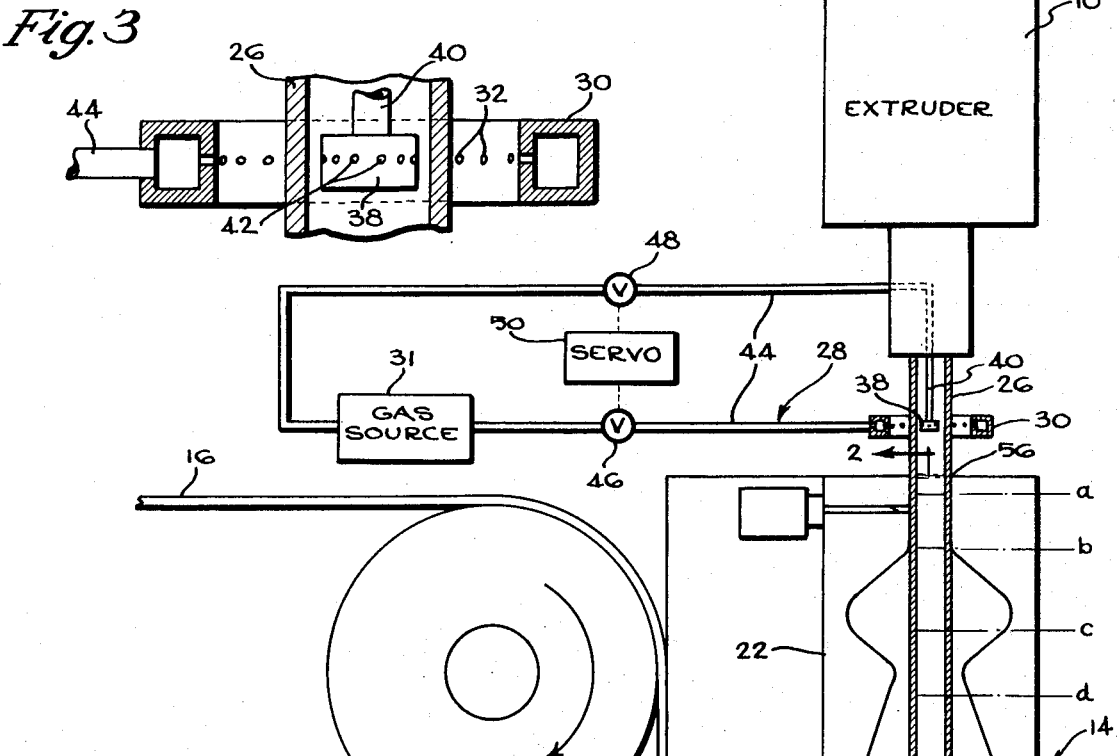
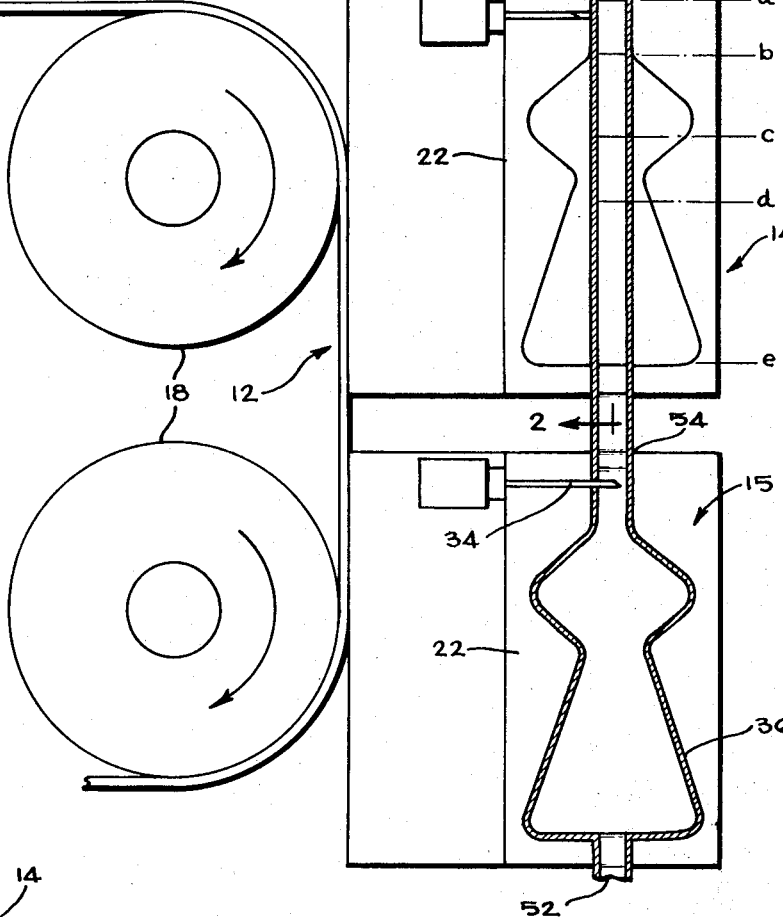
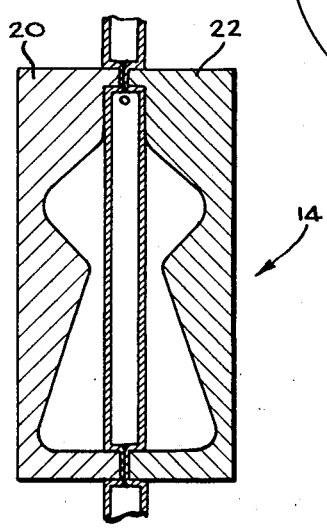
Fig. 3
Fig. 1
Fig. 2
INVENTORS
Robert P. Fischer
Donald H. Straub
*Anderson, Luedeka, Fitch, Even, & Tabin*
ATTYS.

APPARATUS FOR MOLDING PLASTIC ARTICLES

The present invention relates to blow molding of hollow plastic articles such as bottles and containers. More particularly it is directed to an improved method and apparatus for blow molding plastic bottles and containers with cooling of the parison.

Thin walled plastic bottles and containers commercially employed to package various household liquids such as detergent and bleach are commonly formed by a blow molding operation. In commonly used blow molding operations, the plastic is formed into a heated tubular parison by an extruder. The parison exits vertically from the extruder and is captured at uniform intervals by a moving mold assembly which severs the parison and blows the bottle followed by release of the finished product. Prior art methods of blow molding suffer several limitations such as parison attenuation, non-uniform distribution of plastic in the walls of the finished bottle, thermal degradation of the plastic and unduly long molding cycle times due to the time required for cooling of the blown bottle before it can be released from the mold.

It is an object of the present invention to provide an improved apparatus for the blow molding of hollow plastic articles.

It is a further object of the present invention to provide an improved method for blow molding of hollow plastic articles.

Still a further object of the present invention is to provide an improved cooling system for use in a plastic blow molding apparatus.

These and other objects of the present invention will become evident in connection with the following detailed description in conjunction with the drawings in which:

FIG. 1 is an elevational view, partially schematic, of a portion of a blow molding apparatus embodying the present invention;

FIG. 2 is a sectional view of a mold taken along line 2—2 of FIG. 1; and

FIG. 3 is an enlargement of a portion of FIG. 1 showing the cooling system embodying the present invention.

The invention is shown in the drawings for purposes of illustration embodied in a portion of a bottle blow molding apparatus including an extruder 10 vertically disposed above a moving mold assembly 12. The mold assembly 12, only partially illustrated, includes a plurality of molds 14, 15 mounted on an endless conveyor 16 for movement through a continuous loop, one portion of which involves vertical movement in a downward direction around a pair of spaced parallel rolls 18. Each mold 14, 15 is a split mold comprising two similar halves 20 and 22 (FIG. 2). For convenience of explanation the molds are shown in FIG. 1 with one half removed. The mechanism for opening and closing the mold halves at the desired time is conventional in the art and is not illustrated herein as it forms no part of the present invention. The extruder 10 forms a cylindrical plastic parison 26 which moves downwardly from the extruder in alignment with the molds 14, 15 during the vertical portion of their path.

A cooling system 28 is interposed between the extruder head and the position of first engagement of the parison by the upper mold 14. This system includes a hollow annular cooling ring 30 connected to a gas source 31 and having a series of inwardly directed openings 32 through which suitable cooling fluid from gas source is directed onto the outer surface of parison to cause controlled cooling of the parison prior to engagement by the mold.

The apparatus of FIG. 1 may be used for blow molding operations with any of the commonly employed plastics. In the case of a typical plastic such as polyvinyl chloride, the operation of the apparatus is usually continuous. In such an operation, the softened plastic is extruded from the extruder 10 which is conventional and may be either single or twin screw and either single or double staged running without an accumulator. For other plastics of less thermal sensitivity such as polyethylene and polypropylene, intermittent extrusion is possible and, in such cases, the extruder is operated with an accumulator. Such operations are well known in the extruding and blow molding art and form no part of the present invention.

When the parison 26 in the form of a tube of plastic is extruded from the head of the extruder 10, it is in a highly softened condition, and is permitted to proceed vertically downward without contacting any other portion of the apparatus until the end of the parison reaches a point approximately at the bottom edge of the top mold 14 in the position illustrated in FIG. 1. At that point, the mold 14, then in its open condition and proceeding downwardly at the same velocity as the parison 26, closes on the parison as shown in FIG. 2 and pinches and cuts a length from the parison suitable for the molding of a bottle.

The actual blowing of the bottle takes place in the next stage shown in the bottom mold 15 of FIG. 1. Blowing of the bottle is typically accomplished by inserting a hypodermic 34 through the wall of the sealed length of parison and forcing a gas such as air inside the parison by pressurized means not shown, to cause the parison to expand to conform to the walls of the mold resulting in a finished bottle 36 requiring only minor trimming. After the bottle has been formed, the hypodermic is withdrawn and the mold proceeds around the underside of the conveyor to the left in FIG. 1. When the bottle has cooled sufficiently to be self-supporting the mold opens and the bottle is ejected.

The cooling system of the present invention in addition to the cooling ring 30 and the gas source 31 includes, in the illustrated embodiment, a cooling nozzle 38 mounted on a hollow stem 40 and hanging vertically below the head of the extruder 10 concentric with the tubular parison 26 and the cooling ring 30 (FIG. 3). For maximum effectiveness, the vertical position of the ring 30 and nozzle 38 should be just below the extruder head to apply the cooling fluid to the parison as it exits from the extruder. The cooling nozzle is circular in profile and is provided with a series of openings 42 around its outer periphery for permitting gas to impinge on the inner wall of the tubular parison. The outer diameter of the nozzle 38 is substantially smaller than the inner diameter of the parison to avoid contact therewith.

Both the cooling ring 30 and the cooling nozzle 38 are connected to the gas source 31 by suitable tubes 44 shown schematically in FIG. 1. The use of the cooling nozzle in the center of the parison is an optional feature of the present invention and may be dispensed with unless the walls of the parison are of sufficient thickness and the temperature of the cooling fluid is low enough to set up significant thermal gradients in the walls of the parison 26 causing non-uniform cooling and therefore distortion in the finished walls of the bottle. The remainder of the cooling system 28 is made up of a pair of valves 46 and 48 mounted in the tubes 44 to control the rate of flow of the gas from the source to the cooling ring 30 and the cooling nozzle 38 with a regulator in the form of a servomechanism 50 which controls the position of the valves 46 and 48 and consequently the cooling fluid flow to the ring 30 and nozzle 38 in a predetermined manner explained in detail hereinafter. It is also within the scope of the invention to substitute slits or other shaped openings for the openings 32 and 42 in the ring 30 and nozzle 38 or to eliminate the ring entirely and employ mounted nozzles adjacent the parison.

In the event that, for a particular application, the only consideration is the prevention of parison attenuation due to the pull of gravity on the free parison prior to engagement by the molds the servomechanism might be eliminated from the cooling system and a constant flow of cooling fluid directed onto the parison. For most applications, however, the four considerations set forth earlier, namely parison attenuation, non-uniform distribution of plastic in the walls of the finished bottle, thermal degradation of the plastic and unduly long molding cycle time are all considerations in the application of cooling fluid to the surface of the parison.

Obviously, all of these factors, although related to the cooling in some manner are not controlled by the same parameters. For example, thermal degradation of plastics is a function of both time and temperature. Therefore, any cooling on the inner or outer surface of the parison results in the prevention of some thermal degradation of the plastic structure which might result in a weakening of the tensile strength or the impairment of other properties of the plastic. On the other hand, for parison attenuation, the problem becomes more serious as the parison extends itself from the extruder head adding increasing weight. Thus, greater cooling at the upper end of each parison section defined by the mold length is desirable to prevent parison attenuation. Molding cycle times, much like thermal degradation, can be improved most by a maximum cooling without hardening of the plastic at all points along the parison. Finally, the material distribution in the finished bottle is a complex problem resulting from the irregular shape of the bottle and the need for greater plastic deformation of the parison in one area than in another. In the prior art, this resulted in bottle walls of varying thickness.

By employing a regulator such as the servomechanism 50 to control the flow of cooling fluid onto the parison, any desired balance of the four factors may be attained. In this connection, the servomechanism may be of a conventional design so long as it is synchronized with the movement of the mold assembly 12 so that one complete cycle of the servomechanism corresponds to the distance from the top edge of the mold 14 to the top edge of the mold 15. Thus if it is desired to prevent parison attenuation without unduly cooling the remainder of the parison section, the point corresponding to the top of any mold section should be minimally cooled and the cooling rate should be gradually increased to a point on the parison corresponding to the top of the next mold at which point the greatest weight of parison would be suspended from the extruder. With this type of cycling, a minimal amount of cooling would be applied to that portion of the parison corresponding to the point 52 at the bottom of the lower mold 15 after which the cooling would be gradually increased to maximum cooling on the portion of the parison subsequently located at the point 54 at the upper edge of the mold 15. Then, the cooling would again become minimal due to an adjustment of the valve 46 and 48 by the servomechanism 50 and would again gradually increase to a maximum flow on the portion of the parison which would be located at the upper wall of the mold 14 as indicated at 56.

If, on the other hand, the primary consideration in the particular operation is the attainment of uniform walls in the finished bottle a typical cooling cycle provides for more cooling in the areas deformed the most and less cooling in the lesser deformed areas so that more flow will occur from the lesser deformed areas into the greater deformed areas of the bottle. For example, the portion of the parison between lines indicated at $a$ and $b$ in the neck part of the upper mold 14 would be provided with minimal cooling, the portion between lines $b$ and $c$ would be provided with maximum cooling, the portion between lines $c$ and $d$ would again be provided with less cooling and finally, the portion of the parison between lines $d$ and $e$ would have a gradual increase in cooling to a maximum at the bottom of the bottle indicated by the line $e$. By employing such variations in the flow of cooling medium in a cycle for each length of parison, problems of the parison attenuation, mold cycle time, and thermal degradation are alleviated to some extent. At the same time however, the areas of greatest diameter in the finished bottle are provided with relatively uniform walls which would not have thin spots rendering the bottle unsuitable for commercial use.

It is also possible to employ cooled or heated gas and to employ many commonly used cooling gases such as air, nitrogen or carbon dioxide in the cooling system. With a raised heating temperature, the cooling fluid obviously would have less effect on the molding cycle time, plastic thermal degradation and parison attenuation but may be advisable in certain applications to attain walls of uniform thickness in the finished bottle. It will also be evident to those skilled in the art that the cycling of the servomechanism is a function of the shape of the bottle and can be varied to accommodate different shapes.

While the present invention has been illustrated and described in connection with specific embodiments, its scope is intended to be limited only by the scope of the following claims.

What is claimed is:

1. In an apparatus for blow molding hollow plastic articles, the combination of an extruder for extruding a tubular parison, a series of moving blow molds adapted to sever lengths of said tubular parison and to blow said lengths into said plastic articles, cooling means positioned adjacent said tubular parison between said extruder and the point of contact of the parison with said molds and adapted to direct cooling fluid onto the surface of said parison as it exits from said extruder, and means for regulating the application of the cooling fluid by said cooling means onto the surface of said parison, said regulating means being operable to periodically vary the flow of cooling fluid to limit parison attenuation and to attain uniform walls in the finished article.

2. An apparatus as set forth in claim 1 wherein said cooling means is stationary and said parison moves from said extruder through said cooling means to said molds, and wherein said regulating means is operable to periodically vary the flow of cooling fluid in predetermined cycles corresponding to each mold length to selectively cool different portions of said parison whereby the wall thickness of the hollow plastic article is controlled during blowing.

3. An apparatus as set forth in claim 2 wherein said predetermined cycles of cooling fluid flow vary from a minimum flow against the portion of the parison to be engaged by the bottom of each mold to a maximum at the portion of the parison to be engaged by the top of the mold to inhibit parison attenuation due to gravity and wherein said regulating means further comprises a servomechanism and valve synchronized with the movement of said molds to control said cycles.

4. An apparatus as set forth in claim 2 wherein said predetermined cycles of cooling fluid flow vary to provide maximum cooling in areas of the parison to be subjected to greatest plastic flow in the mold thereby promoting uniform wall thickness throughout the finished article.

* * * * *